United States Patent [19]

Marbukh et al.

[11] 3,974,393

[45] Aug. 10, 1976

[54] METHOD OF SWITCHING HYDRO-ELECTRIC UNIT FROM GROUP POWER CONTROL INTO THE INDIVIDUAL POWER CONTROL DUTY

[76] Inventors: Veniamin Anatolievich Marbukh, Mokhovaya ulitsa, 39, kv. 9; Veniamin Samuilovich Lychak, prospekt Metalliatov, 82, kv. 350; Evgeny Andreevich Goncharov, Moskovsky prospekt, 174, kv. 396, all of Leningrad, U.S.S.R.

[22] Filed: Jan. 23, 1975

[21] Appl. No.: 543,546

Related U.S. Application Data

[63] Continuation of Ser. No. 437,377, Jan. 28, 1974, which is a continuation of Ser. No. 332,098, Feb. 13, 1973, abandoned.

[52] U.S. Cl. .............................. 290/40 R; 307/85; 307/93; 290/43
[51] Int. Cl.² ......................................... F03G 13/00
[58] Field of Search ................... 290/43, 40; 307/44, 307/43, 85, 86, 87, 92, 93

[56] References Cited
UNITED STATES PATENTS

| | | |
|---|---|---|
| 3,219,832 | 11/1965 | Avery .................................... 290/40 |
| 3,222,532 | 12/1965 | Oldenburg ............................. 290/40 |
| 3,546,472 | 12/1970 | Hoffman ................................ 290/40 |

*Primary Examiner*—Herman Hohauser
*Attorney, Agent, or Firm*—Holman & Stern

[57] ABSTRACT

A method of switching a hydro-electric unit from the group power control into the individual power control duty is disclosed wherein control system, preferentially featuring an electrohydraulic controller, of the hydro-electric unit being switched into the individual control duty is not fed with the output voltage available from the common power pre-setter of all the hydro-electric units under group control, but with the output voltage available from the individual power pre-setter of the hydro-electric unit being switched into the individual power control duty. The voltages from the individual power pre-setter are compared with the output voltage from the common power pre-setter and the resulting voltage equal to the difference of the voltages being compared, is used to shape the signal for changing the setting of the individual power pre-setter, the value of the setting required to switch the hydro-electric unit into the individual control duty being selected so that the output voltages from both the common and the individual pre-setters will be approximately equal.

3 Claims, 1 Drawing Figure

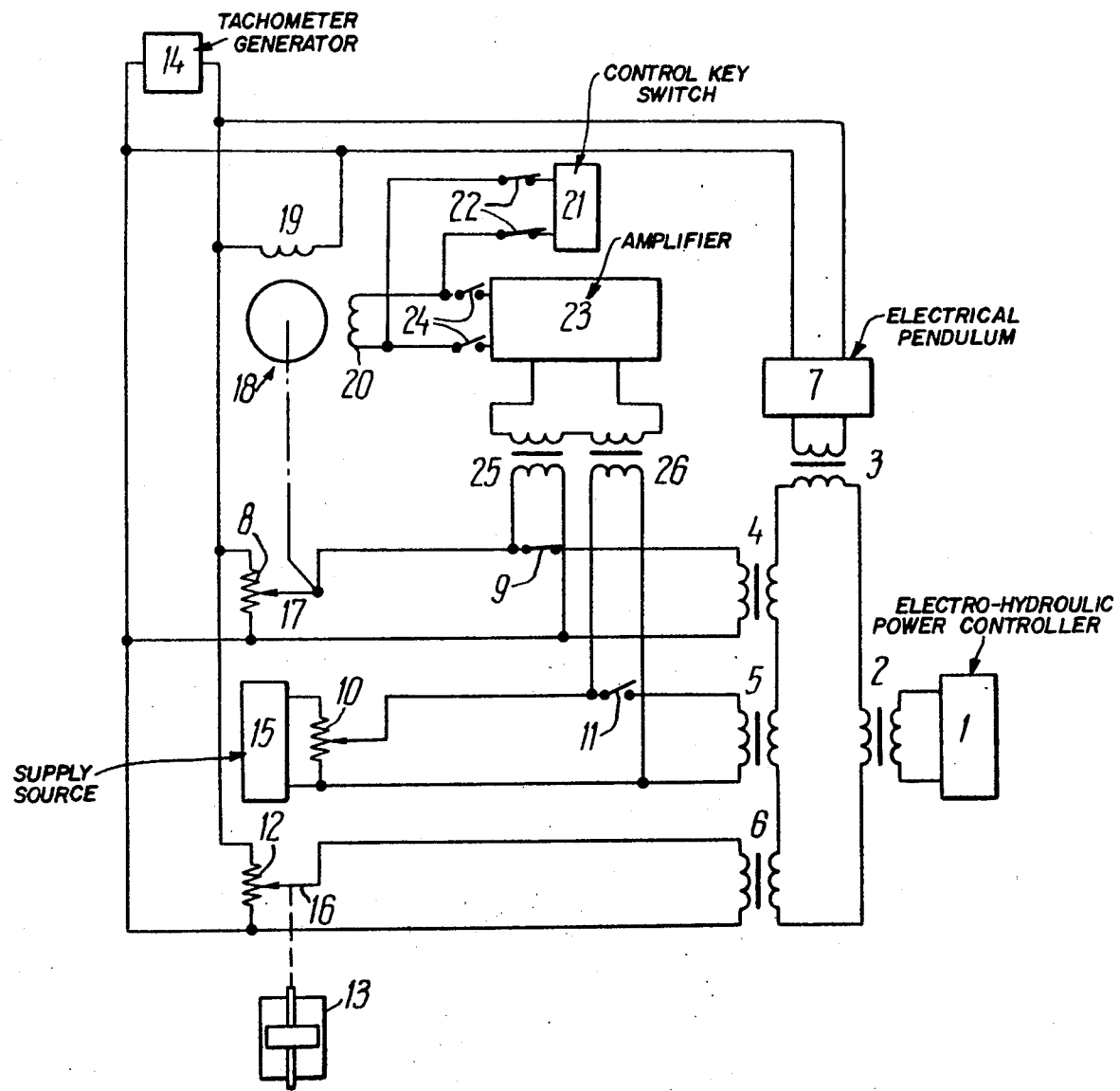

METHOD OF SWITCHING HYDRO-ELECTRIC UNIT FROM GROUP POWER CONTROL INTO THE INDIVIDUAL POWER CONTROL DUTY

This is a continuation of application Ser. No. 437,377 filed Jan. 28, 1974 which in turn is a continuation of application Ser. No. 332,098 filed Feb. 13, 1973, now abandoned.

BACKGROUND OF THE INVENTION

The present invention relates generally to the field of controlling a hydro-electric unit, and more specifically it relates to a method of switching a hydro-electric unit from group power control duty into the individual power control duty.

A method of switching a hydro-electric unit from a group power control duty into the individual power control duty, according to which the control system with an electro-hydraulic controller adapted to control, the hydro-electric unit is fed not with the output overall voltage available from the power setter for all the hydro-electric units under group control but with the output voltage available from the individual power setter.

The output voltage from the individual power pre-setter is also utilized to shape the signal required for changing the setting of the individual pre-setter to reduce the push when the hydro-electric unit is switched to the individual power control duty.

The afore-mentioned signal is shaped by comparing the output voltage from the individual power pre-setter with the output voltage from the servomotor position transducer of the inlet vanes of the hydro-electric unit.

The principal disadvantage of the heretofore-known method lies in the fact that switching of a hydro-electric unit into the individual power control duty is effected with no push, i.e., with no power variation, in the only case when the supply mains frequency does not differ from that of normal.

In all other cases switching of a hydro-electric unit into the individual control duty is accompanied with power push. The term powerpush means that the transition from one operational mode to another is accompanied by an abrupt change in the power.

SUMMARY OF THE INVENTION

The invention is concerned with the provision of a method of switching a hydro-electric unit from the group power control duty into the individual power control duty through the use of the output voltage from the individual power pre-setter, where the signal required to change the setting thereof is so shaped that the hydroelectric unit will be switched into the individual power control duty without any power push.

This object is accomplished due to the fact that in the method of switching the hydro-electric unit from the group power control duty into the individual power control duty, where the control system, preferentially featuring an electro-hydraulic controller, of the hydro-electric unit being switched into the individual power control duty is fed not with the overall output voltage available from the power pre-setter common for all the hydro-electric units under group control, but with the output voltage from the individual power pre-setter of the hydro-electric unit being switched into the individual power control duty, the output voltage also being utilized to shape the signal required to change the setting of the individual power pre-setter to obtain the value required for switching the hydro-electric unit into the individual power control duty with no power push. According to the present invention, the output voltage available from the individual power pre-setter is compared with the output voltage available from the common power pre-setter, and the resulting voltage, which is essentially a difference of the afore-mentioned voltages under comparison, is used to shape the signal for changing the setting of the individual power pre-setter. The value of which required to switch the hydro-electric unit into the individual power control duty without any push being selected so that the output voltages of both the common and individual power pre-setters will be equal.

BRIEF DESCRIPTION OF THE DRAWING

A detailed description of the proposed method of switching a hydro-electric unit from the group power control duty is given below into the individual power control duty by way of the embodiment of the control system, wherein the method is realized, with due reference to the accompanying drawing, which presents a simplified block diagram of the hydro-electric power control system with a detailed disclosure of all the elements required to provide switching of the hydro-electric unit into the individual power control duty, according to the present invention.

DETAILED DESCRIPTION OF THE PREFERRED EMBODIMENT

The power control system of the hydro-electric unit illustrated in the drawing, incorporates an electro-hydraulic power controller whose input 1 is connected to the secondary winding of a transformer 2.

The primary winding of the transformer 2 is connected into the summing circuit made by the series-connected secondary windings of transformers 3, 4, 5 and 6 the primary windings of which are respectively connected to the outputs of an electrical pendulum 7, an individual pre-setter 8 through a breaking or normally closed contact 9 of the relay (the relay coil being not shown in the drawing), a common pre-setter 10 through a making or normally open contact 11 of the relay and a position tranducer 12 of a servomotor 13 of the guiding device of a hydro-turbine (not shown in the drawing). The electrical pendulum 7, individual pre-setter 8 and the transducer 12 are connected to a tachometer generator 14 of the hydro-electric unit.

The common pre-setter 10 is fed from a self-contained supply source 15.

The individual pre-setter 8, the common pre-setter 10 and the transducer 12 are essentially potentiometers, a moving arm 16 of the transducer 12 and a moving arm 17 of the individual pre-setter 8 being operatively associated with the servomotor 13 and an electric motor 18, respectively. The field winding 19 of the electric motor is also fed from the tachometer generator 14.

A control winding 20 of the electric motor 18 is connected to a key control switch 21 through breaking or normally closed contacts 22 of the relay and to the output of an amplifier 23 through making or normally open contacts 24 of the relay. The input of the amplifier 23 is connected to the series-connected secondary windings of transformers 25 and 26, the primary windings thereof being connected to the outputs of the individual pre-setter 8 and the common pre-setter 10, respectively.

In the attached drawing, the herein-disclosed device is shown in the position corresponding to the individual control duty of the hydro-electric unit.

When switching the hydro-electric unit into the group control duty, the operation of the relay causes its breaking contacts 9 and 22 to break and the making contacts 11 and 24 to make.

In this case, the control winding 20 of the electric motor 18 is disconnected from the control key switch 21 to be connected to the amplifier 23, the output voltage available from the individual power pre-setter being taken from the transformer 4, whereas the output voltage from the common power pre-setter 10 is delivered to the transformer 5. At the group control duty, the power control of the hydro-electric unit is effected through the use of the common power pre-setter 10 which is also used for carrying out power control of other hydro-electric units under group control.

This being the case, the transformers 25 and 26 are fed with output voltages from the individual power pre-setter 8 and the common power pre-setter 10, respectively. The aforementioned transformers are connected into the circuit so that they provide the comparison of the output voltages available from both pre-setters. If the above-said output voltages are of different values, the resulting voltage fed to the amplifier 23 is proportional to the difference of the voltages being compared.

The control winding 20 of the electric motor 18 is power supplied from the amplifier 23 and the electric motor operates and so shifts the moving arm 17, thereby changing the setting of the individual pre-setter 8, until the output voltage available from the aforementioned pre-setter is equal to the output voltage from the common power pre-setter 10.

Thus, the output voltage of the individual power presetter 8 is always maintained approximately equal to the output voltage of the common power pre-setter 10. Consequently, whatever the moment of switching the hydro-electric unit from the group control duty into the individual control duty and irrespective of the fact whether the supply mains frequency is normal or differs therefrom, switching will take place without any push, since in this case the control system instead of the signal from the common power pre-setter 10 receives the analogous signal from the individual power presetter 8, which does not affect the equilibrium conditions of the control system.

The herein-disclosed method of switching a hydro-electric unit from the group power control duty into the individual power control duty allows for the elimination of power pushes within the electrical network which the given hydroelectric unit operates for, when the hydro-electric unit is switched into the individual control duty.

Thus, the present method in turn, contributes to an increased reliability of operation of both the hydro-electric unit which is switched into the individual power control duty and the entire electrical network.

What we claim is:

1. A method of switching a hydro-electric unit from the group power control duty into the individual power control duty, said method comprising the steps of disconnecting a control system, preferentially including an electro-hydraulic controller, of the hydro-electric unit being switched into the individual control duty from the output voltage available from a common power pre-setter of all the hydro-electric units under the group power control, connecting the control system to the output voltage available from an individual power pre-setter of the hydro-electric unit being switched into the individual power control duty, comparing the output voltage of the individual power pre-setter with the output voltage of the common power pre-setter, and transferring the resulting voltage equal to the difference of the voltage being compared to shape the signal for changing the setting of the individual power pre-setter, the value of the setting required to switch the hydro-electric unit into the individual power control duty without any power push being selected so that the output voltages under comparison of both the common and individual power pre-setters will be equal.

2. A method for switching a hydro-electric unit from group power control duty into individual power control duty, comprising the steps of:
    comparing the output voltage of an individual power pre-setter for said hydro-electric unit with the output voltage of a common power pre-setter for a plurality of hydro-electric units, inclusive of said hydro-electric unit, continuously during the period of group control of said plurality of units by an electro-hydraulic controller;
    transferring a resulting voltage corresponding to the difference of said output voltages being compared, to a means for changing the setting of the individual power pre-setter;
    resetting the individual power pre-setter by said means in response to said resulting voltage so that said output voltages being compared will be equal, continuously during said period;
    disconnecting said electro-hydraulic controller from the output voltage available from said common power pre-setter;
    connecting said electro-hydraulic controller to the output voltage available from said individual power pre-setter;
    whereby said hydro-electric unit may be switched from group power control duty into individual power control duty at any time during said period of group control of said plurality of hydro-electric units, without incurring a power push.

3. Apparatus for switching a hydro-electric unit from group power control to individual power control, comprising:
    a common power pre-setter driven by a supply source, for setting the power output of a plurality of hydro-electric units inclusive of said hydro-electric unit, in a group automatic power control mode;
    an individual power pre-setter driven by a tachometer generator connected to said hydro-electric unit, for setting the power output of said hydro-electric unit in an individual automatic power control mode;
    a comparator having inputs connected to said common power pre-setter and said individual power pre-setter, for comparing the output voltages from said common power pre-setter and said individual power pre-setter and outputting a resultant voltage proportional to their difference;
    an electric motor having an electrical input connected to the output of said comparator and a mechanical output linkage connected to said individual power pre-setter for adjusting said individual power pre-setter in response to the resultant voltage output from said comparator so as to make the output voltage of said individual power pre-setter equal to the output voltage from said common power pre-setter;

a first transformer having its primary coil switchably connected to said individual power pre-setter during said individual automatic power control mode;

a second transformer having its primary coil switchably connected to said common power pre-setter during said group automatic power control mode;

a third transformer having its primary coil series connected with the secondary coils of said first and second transformers;

an electro-hydraulic controller having control inputs connected to the secondary coil of said third transformer, for controlling the power generated by said hydro-electric unit in response to the signal impressed upon said third transformer;

whereby said hydro-electric unit can be switched from said group automatic power control to said individual automatic power control at any time without a power push resulting from an abrupt change in the voltage impressed upon said third transformer in the course of switching from said common power pre-setter to said individual power pre-setter.

* * * * *